US011050576B2

(12) United States Patent
Lee et al.

(10) Patent No.: US 11,050,576 B2
(45) Date of Patent: Jun. 29, 2021

(54) INTERCOM-NETWORK STATION, INTERCOM NETWORK, AND METHOD

(71) Applicant: RIEDEL Communications International GmbH, Wuppertal (DE)

(72) Inventors: Jiou-Pahn Lee, Wuppertal (DE); Thomas Riedel, Wuppertal (DE)

(73) Assignee: RIEDEL COMMUNICATIONS INTERNATIONAL GMBH, Wuppertal (DE)

( * ) Notice: Subject to any disclaimer, the term of this patent is extended or adjusted under 35 U.S.C. 154(b) by 0 days.

(21) Appl. No.: 15/815,752

(22) Filed: Nov. 17, 2017

(65) Prior Publication Data
US 2018/0198635 A1 Jul. 12, 2018

(30) Foreign Application Priority Data

Dec. 9, 2016 (DE) .......................... 102016123968.2
Apr. 3, 2017 (DE) .......................... 102017107150.4

(51) Int. Cl.
*H04L 12/18* (2006.01)
*H04M 1/72513* (2021.01)
(Continued)

(52) U.S. Cl.
CPC ...... *H04L 12/1813* (2013.01); *H04L 12/1818* (2013.01); *H04M 1/72513* (2013.01);
(Continued)

(58) Field of Classification Search
CPC . H04L 12/1813; H04W 4/80; H04M 1/72513; H04M 3/44; H04M 3/56;
(Continued)

(56) References Cited

U.S. PATENT DOCUMENTS 6,505,780 B1 * 1/2003 Yassin ................ B60R 25/2081
235/384
2007/0064897 A1 * 3/2007 Lee ...................... H04M 11/025
379/159
(Continued)

FOREIGN PATENT DOCUMENTS

DE 19745350 C1 8/1998
DE 10205501 A1 8/2003
(Continued)

OTHER PUBLICATIONS

Helmut Henne: Gegensprechanlagen, Literarische Dialoge (Botho Strauss) und linguistische Gespraechsanalyse. In: Gespaeche zwischen Alltag und Literatur. Beitraege zur germanistischen Gespraechsforschung. Hrsg. von Dieter Cherubim, Helmut Henne, Helmut Rehbock (=Reihe germanistische Linguistik, 53), Niemeyer, Tuebingen 1984, ISBN 3-484-31053-7, S. 1-19.
(Continued)

*Primary Examiner* — Nicholas R Taylor
*Assistant Examiner* — Chong G Kim
(74) *Attorney, Agent, or Firm* — Andrew Wilford

(57) ABSTRACT

The invention concerns amongst other things a user (11*a*, 11*b*, 11*c*, 11*d*, 11*e*, 11*f*, 11*g*) to an intercom network (10) for carrying out real-time audio communication with other users of this intercom network, comprising an audio input, in particular a microphone (14, 14*a*, 14*b*, 14*c*, 14*d*, 14*e*, 14*f*) or a microphone port (28) and a connection port (29) or a communication module (30) for connecting with a switching center (19*a*, 19*b*) of the intercom network, comprising at least one functionality that can be set as a parameter, in particular manually set, such as key assignment, direct-dial key, brightness, volume or the like, characterized in that an NFC element (22, 22*a*, 22*b*, 22*c*, 22*d*, 22*e*, 22*f*) is provided on the user that can be used to carry out a communication with a counterpart NFC element (23) assigned to an operator (25).

9 Claims, 3 Drawing Sheets

Figure 1:
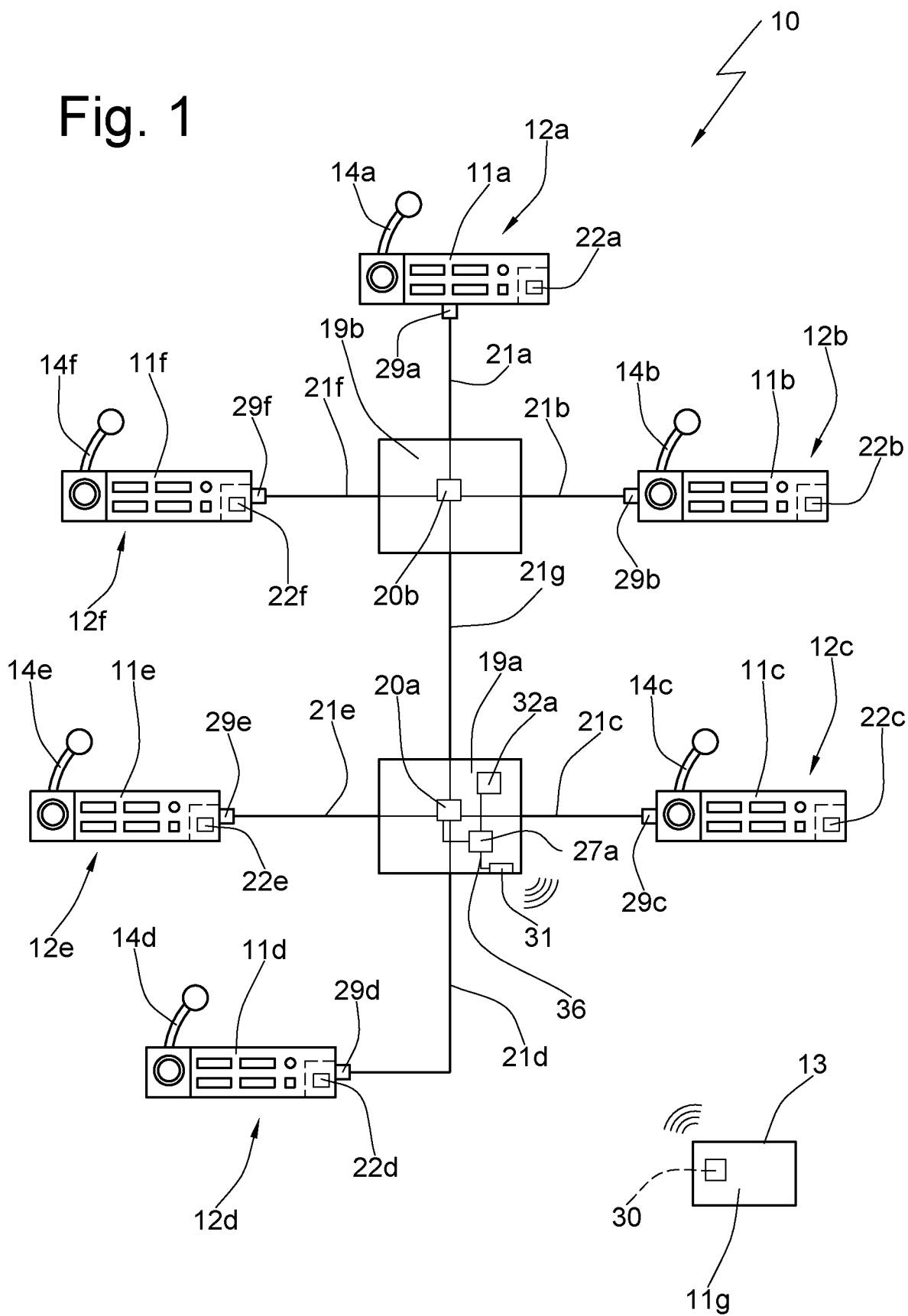

(51) Int. Cl.
*H04M 3/56* (2006.01)
*H04M 9/00* (2006.01)
*H04M 11/00* (2006.01)
*H04M 3/44* (2006.01)
*H04W 4/80* (2018.01)
*H04M 1/60* (2006.01)
*H04M 1/72412* (2021.01)

(52) U.S. Cl.
CPC ............... *H04M 3/44* (2013.01); *H04M 3/56* (2013.01); *H04M 9/00* (2013.01); *H04M 11/00* (2013.01); *H04W 4/80* (2018.02); *H04M 1/6058* (2013.01); *H04M 1/6066* (2013.01); *H04M 1/72412* (2021.01); *H04M 2203/5009* (2013.01); *H04M 2250/04* (2013.01)

(58) Field of Classification Search
CPC ...... H04M 9/00; H04M 11/00; H04M 1/6058; H04M 1/6066; H04M 1/7253; H04M 2203/5009; H04M 2250/04
USPC .......................................................... 709/204
See application file for complete search history.

(56) References Cited

U.S. PATENT DOCUMENTS

| | | | | |
|---|---|---|---|---|
| 2008/0118045 | A1* | 5/2008 | Polozola | H04M 11/007 379/167.14 |
| 2008/0180213 | A1* | 7/2008 | Flax | G10L 15/30 340/5.84 |
| 2013/0023258 | A1* | 1/2013 | Choi | H04M 1/72569 455/418 |
| 2014/0281490 | A1 | 9/2014 | Prakash et al. | |
| 2015/0197205 | A1* | 7/2015 | Xiong | B60R 16/037 701/49 |
| 2016/0050505 | A1 | 2/2016 | Riedel | |
| 2016/0198287 | A1* | 7/2016 | Hulusi | H04M 1/0291 455/41.1 |
| 2016/0381321 | A1* | 12/2016 | Garcia Bort | H04B 3/50 348/14.01 |

FOREIGN PATENT DOCUMENTS

| | | |
|---|---|---|
| DE | 102014104811 A | 10/2015 |
| DE | 102014011963 A | 2/2016 |
| EP | 1675076 A1 | 6/2006 |
| EP | 2533469 A1 | 12/2012 |
| EP | 2608511 A1 | 6/2013 |

OTHER PUBLICATIONS

Peter Kerger: Betriebsinterne Kommunikation. Huethig, Heidelberg 1988, ISBN 3-7785-1097-5.
Herbert Petzoldt: Gegen- und Wechselsprechanlagen (=Elektroakustik, 3), Fachbuchverlag, Leipzig 1952.
@Commons: Intercoms(https://commons.wikimedia.org/wiki/Category:Intercoms?uselang=de)—Sammlung von Bildern, Videos and Audiodateien.
W Wiktionary: Sprechanlage—Bedeutungserklaerungen, Wortherkunft, Synonyme, Uebersetzungen.
1. Peter Kerger: Betriebsinterne Kommunikation, 1988.
@Commons: Near Field Communication (https://commons.wikimedia.org/wiki/Category:Near_field_communication?uselang=de)Sammlung von Bildern.

* cited by examiner

INTERCOM-NETWORK STATION, INTERCOM NETWORK, AND METHOD

First, the invention concerns a user of an intercom network according to the preamble of claim 1.

The applicant has been developing and manufacturing such networks for decades. The applicant belongs to the leading businesses in the world in the field of intercom networks.

Intercom networks and generic users of these intercom networks are described in the applicant's patents DE 10 2014 011 963 [US 2016/0050505] and DE 10 2014 104 811.

A user of an intercom network of the known type can carry out audio communications with other users in real time. For this purpose the user comprises an audio input. This can involve, for example, a microphone into which an operator can speak audio information directly. For the purposes of this patent application audio input may however alternatively also be understood as a microphone port or headset port, i.e. for example a socket for receiving a plug for a cable connection to connect a microphone to the user. 19.

Furthermore the user has a connection port by which the user can be connected directly or indirectly to a switching center of the intercom network. The connection port facilitates the connection of a cable. Alternatively the user has a communication module by which the user can establish a radio connection with the switching center or with another user of the intercom network. Such a radio link is subject in particular to the DECT radio standard. Very broadly however, a wireless transmission between the user and the switching center or between the user and another user also comes in to consideration within the framework of the invention, that transmission being in the VHF, UHF, DECT frequency bands, for example within the frequency ranges from 2.4 gigahertz, 5.2 gigahertz and 5.8 gigahertz.

A user of the generic type and in terms of the invention is formed in particular as a speech station. This involves an intercom device that is typically connected with the switching center by a cable, and that has a microphone and a loudspeaker, as well as a plurality of keys. With the keys, in particular speed-dial keys, a direct, in particular fail-safe, audio connection to another user of the intercom network can be established as a result of an operator pressing the key on the speech station.

Moreover, such a speech station can also comprise further functionalities that can be set, such as for example actuating elements for setting the brightness of a display screen or for setting the volume of the loud speaker or for setting the sensitivity of the microphone or similar. The functionalities can be set as parameters, i.e. values or information, be they absolute values or relative values, can be set, in particularly manually, by operating potentiometers or switches or keys or programmable elements.

According to the invention a user may alternatively be provided as a so-called belt pack. This involves a device that is provided with an independent power supply, for example by a battery or accumulator, which can be attached to an operator, for example to an item of the operator's clothing, or carried by the operator, and that is formed as a mobile terminal of an intercom network. The belt pack has a microphone port by which either a microphone and/or headphones or alternatively a headset, can be connected to a belt pack via a cable or via a radio link, for example Bluetooth. Moreover, the belt pack has a communication module that can exchange audio signals, in particular wirelessly via a DECT radio link, with the switching center of the intercom network or with another user of the intercom network.

State-of-the-art intercom networks are deployed in particular at events or live events such as concerts, Formula 1 races or similar. Here a multiplicity of operators may perform numerous different tasks. In order to be able to perform the complex tasks of an intercom network during a live event with the required reliability, the intercom network and all of its users are configured in advance of the event. In that process, standard values are generally set for a user's functionalities.

During the performance of the live event the operators can go to the respective users where they can, if necessary, carry out adjustments of the functionalities and in particular alter the pre-set parameters—the so-called settings.

Starting with a user of the generic type as this has become known through public prior use by the applicant (not verifiable in print), the aim of the invention consists in further developing the user in such a way that an improved operation of the user is made possible.

The invention achieves this aim through the characteristics of claim 1, in particular though those of the identifier component, and is thus characterized in that an NFC element is provided on the user, by which a communication can be carried out with a counterpart NFC element assigned to an operator. The principle of the invention consists essentially in arranging an NFC element on the user, i.e. an intercom speech station or an intercom belt pack. Such an NFC element is subject to defined radio communication industry standards and can communication with a counterpart NFC element in accordance with these standards. This requires that the counterpart NFC element, at least briefly, approaches the NFC element.

The NFC element is assigned to an operator. The counterpart NFC element is formed, for example, as an object that can be clipped to an item of the operator's clothing or hung around the operator's neck, as is normal for example for security passes or identification objects.

The counterpart NFC element can, for example, be formed as a simple tag that has a user identification or that is described by a user identification. Every user can have a unique identifier, or at least an identifier that is unique for the intercom system.

The NFC element can receive information about the user from the counterpart NFC element following a relative approach by the counterpart NFC element. In this process it is particularly significant that the counterpart NFC element requires no power supply of its own, but rather can receive an electromagnetic impulse as an oscillating circuit from the NFC element. The NFC element is supplied with operating power by the user.

The arrangement according to the invention of an NFC element on the user with which a communication can be carried out with a counterpart NFC element assigned to an operator, thus allows the carrying out of a login or registration by a specified operator on the user.

Further, a device for managing operators can be provided on the user, in which a specified operator or several specified operators are previously saved or noted as authorised operators in the course of a configuration of the intercom network or in the course of the configuration of the user. Alternatively or additionally a specified operator, or the respective specified parameter value for the adjustable functionality of several operators, can be assigned to the device for managing operators. For example, an operator who always wants to enjoy a very high loudspeaker volume during the holding of the event, for example because of the usual working conditions, can automatically have a correspondingly high parameter value allocated to him, as an operator-defined pre-setting or as an operator-dependent setting, as soon as he logs into the user. In order to carry out the login process, all that is needed is a—very simple—approach by the counterpart NFC element, or the object carrying it, towards the NFC element on the user.

Moreover, the invention offers the possibility of falling back on conventional, commercially available components for the NFC element, for example an NFC reading device, and for the counterpart NFC element, for example, a tag.

In this case the tag can, for example, be laminated into a pass or fixed to, e.g. stuck onto, the pass. Thus, a very simple construction and form can be achieved for such a user and for an object carrying the counterpart NFC element.

According to an advantageous embodiment of the invention, the counterpart NFC-element is a component of a portable object that can be carried by the operator, in particular in the same way as a pass, in particular an object that can be hung around his neck or clipped onto clothing. Thus the object can be formed as card-like, in particular like a check card, or like a pass, such as an identity pass and, in the same way as is usual for a security pass, can be hung around an operator's neck or clipped onto him with the aid of clipping means. It is also conceivable that the object is formed like a pass or check card and can be kept in an operator's wallet. In this respect the counterpart NFC element can be permanently assigned to the operator.

Thus—regardless of the location of the event, in particular if the operator is regularly deployed at different events—the operator can always log into the corresponding user with his uniquely identifiable pass, namely the counterpart NFC element.

According to a further advantageous embodiment of the invention, information about the operator can be transmitted to the NFC element by the counterpart NFC element assigned to the operator. The information about the operator, can in particular comprise an identifier or an identification code of the operator, or other information from which the user can draw a conclusion about the operator, for example a mobile phone identification, or a Bluetooth MAC address.

Every operator thus has a unique identifier assignable to that operator. Information about the operator can be saved directly to the counterpart NFC element on the object, or in a memory of the object, which is assigned to the counterpart NFC element. As is usual with NFC tags, the tag can also be directly labeled or configured—in particular uniquely in the factory—so that a user identification is entered into the tag. This user identification can be transmitted—encoded or un-encoded—to the NFC element when the counterpart NFC element approaches the user, and can be processed by the user, in particular by a device for managing operators provided on or allocated to this user.

The invention achieves the aim described above according to a further aspect by the characteristics of claim 4, in particular with those of the identifier component, and is accordingly characterized in that a device for managing operators is allocated to the user on which a log-in and/or registration process can be carried out by an operator.

The principle of the invention essentially consists in the fact that a device for managing operators is provided on or allocated to the user. Such a device can comprise a microprocessor in which suitable conventional electronic components are provided, which facilitate the administration or management of operators. In particular it is possible, in the course of configuring the user, to enter into the device for managing operators, those operators who are intended, or who may be intended, for this user. In addition a parameter value—or in the case of several different functionalities being set, several parameter values—can be assigned to the intended, authorised operators.

The device can only be provided on one specified user, for example, exclusively on the belt pack or on the speech station. However, the invention also encompasses a situation where only a part of the device for managing operators is provided on the user and that part cooperates with other parts of the device for managing operators, wherein the other parts of this device are provided on other users of the intercom network, or an exchange of the intercom network, for example on the switching center. In this case the user at least has a device for managing operators that is intended as a component of a device the whole of which is provided in the intercom network in a centralized or decentralized manner. The device for managing operators provided on the user in the latter case comprises at least one NFC element and means for forwarding the information received from the NFC element—from the counterpart NFC element—to an exchange or a control unit or to the switching center.

A login or registration process can be carried out by an operator on the device for managing operators. For this it is sufficient if the operator briefly moves a counterpart NFC element assigned to him closer towards the NFC element on the user. In this way information can automatically be transmitted from the counterpart NFC element to the NFC element. The information to be transmitted may include information about the operator. In this way, the operator can login and register.

It should be noted that according to this invention, the logging in of the operator to the user can also occur other than by NFC communication. For example the operator can carry out the login or registration process by entering a numerical sequence or a code, or a PIN directly into the user.

Finally, the invention also encompasses a situation where the operator logs into to the user by using the Bluetooth MAC address or another identifier.

According to an advantageous embodiment of the invention, the operator is assigned a specific parameter value. In this way specific preferences or experience values of the operator can be entered or referred to. For example, an assignment of speed-dial keys can be carried out that a particular operator are always gets the speed-dial keys provided on a speech station pre-configured in the same way. The settings can thus be set so that for example the upper left-hand speed-dial key on a speech station of a particular operator enables a direct audio link to another specified operator. In this way the operation of the user during a live event can be made more reliable, since it is possible to refer to this operator's pool of experience. Operating errors can thus be avoided.

According to an advantageous embodiment of the invention, the operator is assigned a specified parameter value. As a result of an operator carrying out a login or registration process on the user, the device for managing operators ensures that as a direct result of the operator carrying out the login process, the parameter value assigned to this operator is used to set the functionality. In this respect, the operator who is logged into the user must on no account make any more adjustments himself.

Instead, the device for managing operators can independently set the functionalities according to the operator. According to a further advantageous embodiment of the invention, the device has a memory in which the parameter value is saved, in association with the operator. The device can be provided directly in the user, or in the switching station, or in another user of the intercom network. The memory is advantageously located in the user and/or in the switching center.

The parameter value is saved in the memory and, in particular in fact, in association with the operator. In this respect, the parameter for setting the functionality is saved in relation to the operators. In this respect a retrieval of this saved parameter value can occur every time the operator logs into the user.

According to a further advantageous embodiment of the invention, following a successful login by the operator to the user, the device sets the functionalities of the user of match the parameter values of this operator. In this way the user-defined settings can be achieved.

The aim described in the introduction is achieved by the invention according to a further aspect through the characteristics of claim 8, in particular through those of the identifier component, and is accordingly characterized in that a device for managing operators is allocated to the user, which as a result of an operator logging into the user retrieves a pre-set parameter value for the operator and sets the adjustable functionalities to match the parameter value.

The principle of the invention essentially consists in that a device for managing operators is allocated to the user, which as a result of an operator logging into the user retrieves a pre-set parameter value for the operator and sets the adjustable functionalities to match the parameter value. In this way user-defined settings can be achieved.

In order to avoid repetitions in relation to the characteristics and concepts used and their interpretation, reference is made to the above explanations.

According to a further advantageous embodiment of the invention, it is provided that the user is formed as a speech station or a belt pack or a headset. In relation to the technical characteristics of a belt pack or a speech station, reference is made to state-of-the-art speech stations or belt packs, which are described in particular in applications DE 10 2014 011 963 A1 and DE 10 2014 104 811 A1, which were mentioned in the introduction. According to a further aspect, the invention relates to an intercom network according to the preamble of claim 10.

The aim of the invention consists in further developing the generic type of intercom network so that it is more reliably and more conveniently configured.

The invention achieves this aim through the characteristics of claim 10.

In addition, the invention also achieves this aim through the characteristics of claim 11.

A configuration device is accordingly provided, with which a pre-setting of the parameter can be carried out, wherein the pre-set parameter value of an operator can be assigned and saved. The configuration device can be, for example, an electric or electronic device that can be connected to the user, e.g. a computer. Alternatively, it can also be provided that the switching center itself constitutes or comprises a configuration device, on which pre-settings for the parameters of the user connected to the switching station can be made by direct manual entries.

According to the invention, the configuration device can assign a pre-set parameter value to an operator. On the other hand a parameter value of a given operator can be pre-set. This set parameter value can be saved together with an assignment to the operator. A corresponding saving action can be carried out either in a switching center of the intercom network, or in one or a number of users of the intercom network to which the operators can log in.

Otherwise, in order to avoid repetitions in relation to the explanation and interpretation of characteristics and concepts, reference is also made to the explanations set out above.

Moreover, the invention concerns a method for operating an intercom network according to the preamble of claim 1.

The aim of the invention is to further develop the known state-of-the-art method, as it is currently put into practice by the applicant (not verifiable in print) so that it becomes more convenient and reliable.

The invention achieves this aim through the characteristics of claim 13.

In order to avoid repetition in relation to the characteristics and concepts used, reference is made in relation to their comprehension and interpretation, to the explanations set out above.

The steps (a) to (c) of claim 13 can advantageously be performed, in terms of time, in advance (and a long way in advance) of the holding of the event, and in particular in a location that is remote from the location of the event. Steps (d) and (e) of claim 13 are advantageously performed immediately before the event or during the holding of the event at the event location.

According to a further advantageous embodiment of the invention it is provided that in the course of carrying out an authorization check, the device only allows an operator to log into a user if the operator is saved and stored in the device as an authorised operator. According to this embodiment, it can be provided that the device carries out an authorization check. The device for managing operators can check, during the course of a login by an operator, whether the user currently trying to log in is even approved as an authorised user or as an authorised operator. In this way an access control is provided.

According to a further advantageous embodiment of the invention it is possible for successive logins to be carried out by several different operators on the same user. This takes into account the fact that during the course of certain events different operators will have to work on the same user.

According to a further aspect, the invention concerns a user according to the preamble of claim 16.

The aim of the invention is accordingly to further develop a state-of-the-art user as described above, so that an improved operation of the user is made possible.

The invention achieves this aim through the characteristics of claim 16, in particular through those of the identifier component, and is accordingly characterized in that an RFID element is provided on the user, by which a communication can be carried out with a counterpart RFID element assigned to an operator.

Like the invention as described according to claim 1, the principle of the invention consists in arranging an RFID element on a user and assigning a counterpart RFID element to an operator. A counterpart RFID element to be assigned to an operator is also called, as in the normal expert way, a transponder. The RFID element to be provided on the user is described as a reading device for retrieving the identification codes on the transponder. For a description of the advantages of the invention according to claim 16 and for an explanation of the functioning and the characteristics of claim 16, reference can be made, in order to avoid repetition, to the above explanations in respect of claim 1 and of the claims that are dependent on claim 1.

Moreover, any information disclosed or communicated in the context of this patent application in relation to an NFC element and/or a counterpart NFC element, can equally also be used in the context of the invention in relation to an RFID element or a counterpart RFID element, and in the context of this patent application counts as disclosed in relation to an RFID element or a counterpart RFID element.

Further advantages are revealed in the sub-claims that have not been cited, as well as by means of the following description of the embodiments depicted in the figures.

Figure 2:
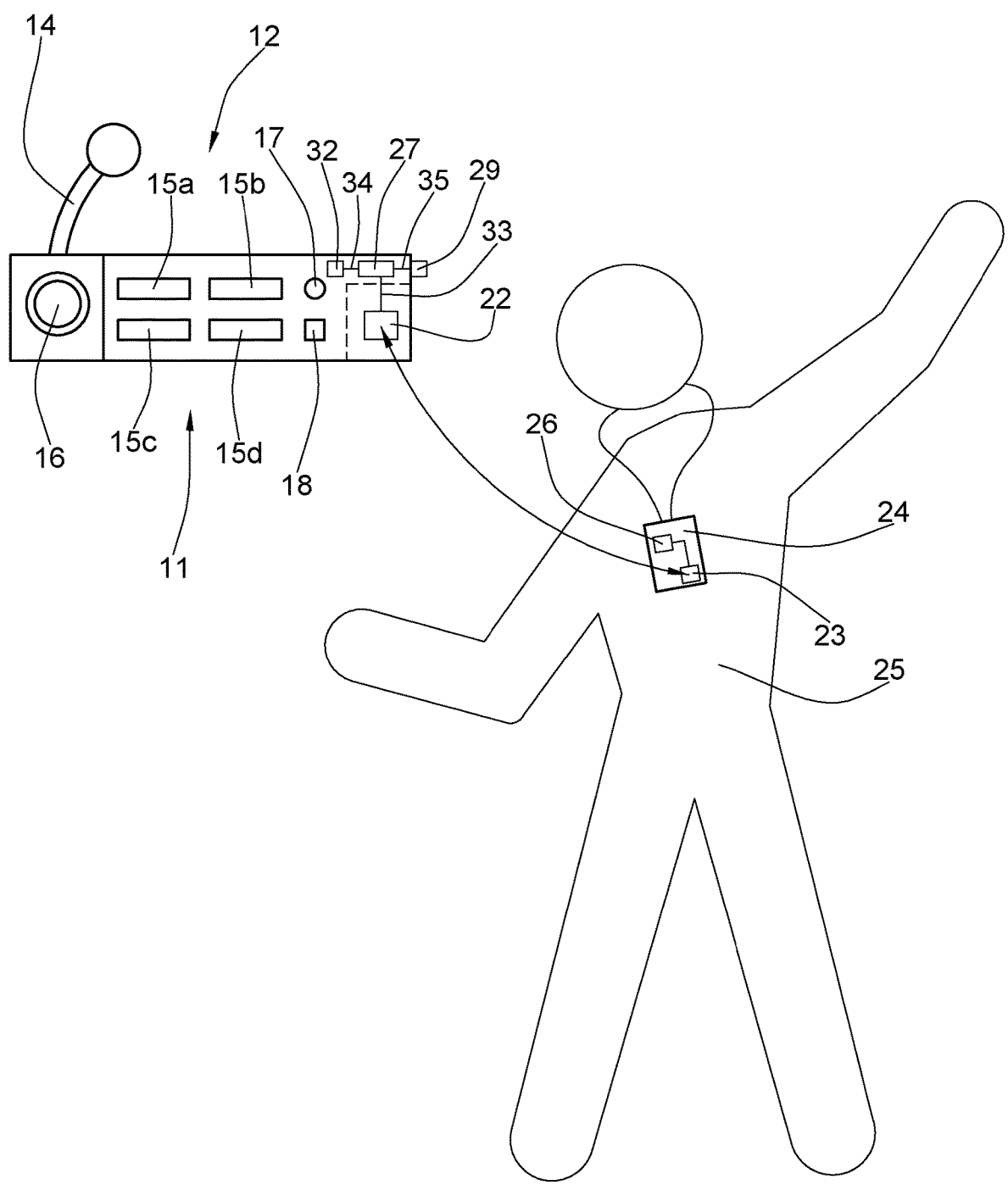
Figure 3:
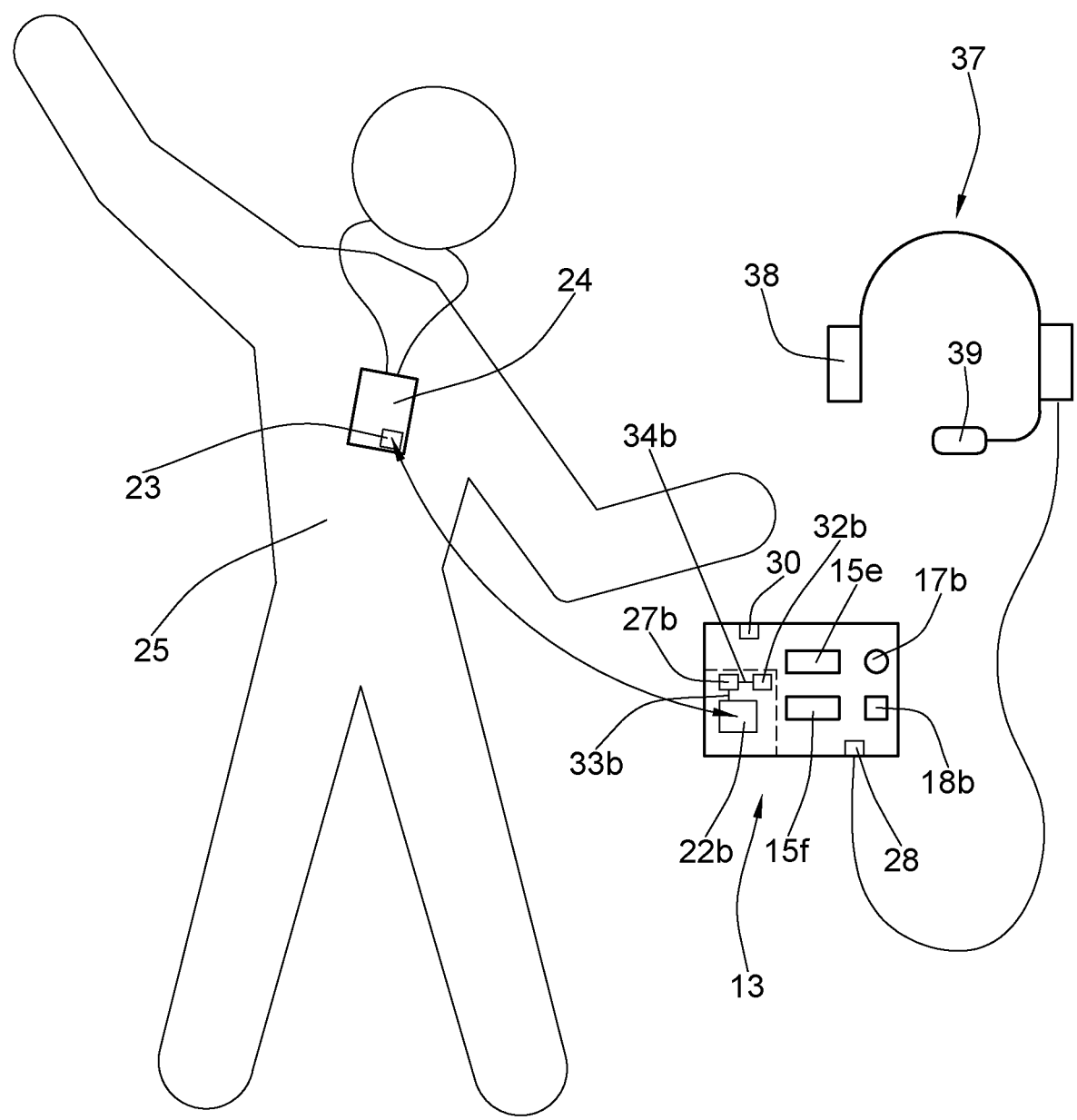

FIG. 1 shows, in a schematic block-diagram type view, an embodiment of an intercom system according to the invention with two switching centers and, connected to them, a total of six speech stations according to the invention and a belt pack with a radio link to the switching center, FIG. 2 shows, in a schematic block-diagram type view, an enlarged image of an embodiment of a speech station according to the invention as in FIG. 1, and an operator carrying a pass-like object with a counterpart NFC element hung around his neck, and FIG. 3 shows the operator in FIG. 2 together with a user formed as a belt pack with a headset connected to it.

In the following description of the figures, embodiments of the invention are described by way of example and with reference to the figures. In the process, for the sake of clarity—and to the extent that different embodiments are concerned—similar or comparable parts or elements or areas are labeled with the same reference symbol, sometimes with the addition of lower case letters.

Characteristics that are only described in relation to one embodiment can, in the context of the invention, also be provided in any other embodiment of the invention. Embodiments changed in this way are encompassed by the invention—even if they are not depicted in the drawings.

All of the disclosed characteristics are in themselves essential to the invention. The disclosure of this application hereby covers, in full, the subject matter disclosed in the associated priority documents (copy of the prior application), as well as the cited publications and the state-of-the-art devices described, also for the purpose of including individual characteristics, or a number of characteristics, of these documents in one or a number of claims of the present application.

The intercom network shown in its entirety and labeled as 10 in the figures is explained below by the embodiments depicted in the figures. The intercom network 10 users formed according to the invention are also described below.

According to FIG. 1, the intercom network 10 comprises two switching centers 19a, 19b, which are connected to each other via a connecting line 21g. Three stationary speech stations 11c, 11d, 11e are connected to the first switching center 19a and three speech stations 11a, 11b, and 11f, to the second switching center 19b.

Each of the users 11a, 11b, 11c, 11d, 11e, 11f, 11g is formed as a speech station 12a, 12b, 12c, 12d, 12e, 12f. The speech stations are each connected to the respective switching station 19a, 19b by their own connecting line 21a, 21b, 21c, 21d, 21e, 21f.

The intercom network 10 according to an embodiment of the invention is deployed at shows and events, in particular live events. In principle, any number of users 11 may be connected to the switching centers 19a, 19b, that number being adapted to the requirements for media coverage, support, or the carrying out of the show or event.

The speech stations 12a, 12b, 12c, 12d, 12e, 12f are shown as stationary users 11a, 11b, 11c, 11d, 11e, 11f. The intercom network 10 according to the invention can moreover also comprise one or a number of mobile users 11g that are formed in the style of a belt pack 13.

First, FIG. 2 is intended to illustrate the basic build and structure of a speech station 12, representing 12a, 12b, 12c, 12d, 12e, 12f, according to the invention:

In the embodiment in FIG. 2 a speech station 12 comprises a microphone 14 and a loudspeaker 16. The operator 25 working at this speech station 12 in FIG. 2 can make spoken entries in to the microphone 14 and hear audio information over the loudspeaker 16. This audio information is bi-directionally received by or transmitted to the speech station 12 via a communication port 29 for connecting a connecting cable 21 of the corresponding switching center 19 (e.g. 19a according to FIG. 1), which is not shown in FIG. 2.

Moreover, FIG. 2 shows that a plurality of speed-dial keys, a total of four speed-dial keys 15a, 15b, 15c, 15d in the case of the embodiment in FIG. 2, are provided on the speech station 12.

By pressing a speed-dial key the operator 25 can put the speech station 12 in FIG. 2 into immediate, direct, secure audio communication with another user on another user 11a, 11b, 11c, 11d, 11e, 11f, 11g to the intercom network 10 in FIG. 1.

A corresponding switching of the direct point-to-point connection is carried out via the switching centers 19a, 19b. If the speed-dial key 15a is set or programmed so that pressing the speed-dial key 15a creates an audio connection with an operator of speech station 12b of the intercom network 10 in FIG. 1, a direct, secure audio connection between the speech station 12 according to FIG. 2 and the speech station 12b according to FIG. 1, is achievable.

The speed-dial keys 15a, 15b, 15c, 15d can be set, wherein the corresponding settings can be retained by the switching center 19a, 19b or saved and/or administered or managed there. Moreover, the speech station 12 in FIG. 2 also makes it clear that a first function key 17 is provided, with which for example, the brightness of the background lighting appearing on the displays for the speed-dial keys 15a, 15b, 15c, 15d can be set. Moreover the speech station 12 in FIG. 2 shows a function key 18, with which for example the volume of the loudspeaker 16 can be set.

In state-of-the-art-speech stations, the operator could only set the functionalities of the speed-dial keys 15a, 15b, 15c, 15d or the function keys 17, 18 manually or on-site. For this purpose a function key 18 formed as a potentiometer, for example, could be manually rotated in order to set the brightness of the display on keys 15a, 15b, 15c, 15d, or the function key 17, also formed like a potentiometer, rotated to set the volume. Equally, a programming of the speed-dial keys 15a, 15b, 15c, 15d could be carried out manually by the operator, e.g. using alphanumeric input fields or via another user interface. Thus, after the intercom network has been installed the user can make adaptions to the local conditions on-site as desired, or with regard to his experience-based principles, e.g. programming a particular speed-dial key 15a so that a convenient or desired user of another speech station is always programmed to have a fixed position on the operating panel.

Thus, for example, the function key 15a may always create a connection with a unit manager.

For the purposes of the present invention, the possibility of a target dial key or call dial key is designated as functionality. Also the setting of a dimming value for the illuminated display of key 15a by the function key 17, or the setting of the volume, is seen as setting a functionality for the purposes of the invention.

The setting of a specified target person or a specified target speech station is seen as the setting of a parameter value for the purposes of the present patent application.

The parameter for a target dial key can, for example, be the name of a specific other operator, e.g. Axel Müller, or his identification number, e.g. operator number 22, or an abbreviation or a code. Alternatively however, the parameter can also be a name of the speech station or the user of the intercom network, such as for example the name "recording director", "moderator" or "artist xy" or similar.

According to the invention, it is provided that an operator 25 can log into a user 11 according to FIG. 2, i.e. into a speech station 12 according to FIG. 2. The explanation of the speech station 12 in FIG. 2 will therefore be entirely exemplary for all users 11a, 11b, 11c, 11d, 11e, 11f, 11g to the intercom network in FIG. 1:

According to FIG. 2, the speech station 12 features a device 27 for managing operators. This involves, for example, a microprocessor or the component of an electronic circuit. The device 27 comprises an NFC element 22 with which it is connected via a connecting line 33.

Moreover, the device 27 for managing operators is connected to a memory 32 via a connecting line 34. Finally, the device 27 for managing operators is, moreover, connected with a communication port 29, e.g. directly via a connecting line 35, or indirectly, e.g. via a control unit, which is not depicted here, via which communication port 29 the speech station 12 can be connected to the switching center 19a in accordance with FIG. 1. The operator 25 has an object 24, like an identity document, which comprises a counterpart NFC element 23. This can, for example, be laminated into the identity card or check-card sized object, or stuck onto it. The counterpart NFC element 23 can also feature a memory chip 26.

In the course of configuring the speech station 12, for example in the course of configuring the intercom network 10 in FIG. 1 and the associated configuration of the speech station 12 in FIG. 2, it is possible to set or program which operator should or may work with the speech station 12 at time of the event. In some cases this can also be a number of people.

Furthermore, a pre-setting of parameter values for the previously described functionalities can be set in the course of configuring the speech station 12. Thus, for example, for a particular operator, e.g. for operator number 22 or the operator named Axel Müller, it can be set so that a pre-setting and saving of the parameter values for the function keys 15a, 15b, 15d is carried out, so that particular target users 11a, 11b, 11c, 11d, 11e, 11f, 11g are addressed when the corresponding speed-dial keys 15a, 15b, 15c, 15d are pressed. It can also be recorded with reference to this user number 22, or for the operator named Axel Müller, that a given parameter value be set for the function keys 17, 18.

Corresponding parameter values can be saved in the memory 32 in the user 11, i.e. the speech station 12, in association with the prescribed operator number 22.

If the live event now takes place, the operator 25 can log into the user 11 in FIG. 2 as follows:

Having moved relatively close to the NFC element 22, the operator 25 holds his identity card object 24 against the NFC element 22 or brings it close to the latter, in particular to a distance of, for example, only a few centimeters. As a result of moving closer, a data communication takes place, according to the NFC standard, between the NFC element 22 and the counterpart NFC element 23.

In the course of this data exchange, the counterpart NFC element can transmit information about the operator 25, for example a user identification or the name of the operator, to the NFC element 22. The counterpart NFC element 23 can either carry this information itself, or can retrieve it from a separate memory element 26 on the object 24.

This information is transmitted from the NFC element 22 via the connecting line 33 to the device 27 for managing operators. Immediately following the receipt of the information about the logged-in user 25, the device 27 can cause the parameter values of this operator 25 that are saved in the memory 26, to be set as functionalities for the corresponding function elements 15a, 15b, 15c, 15d, 15, 17, 18.

To this extent, the operator 25 only needs to identify or register himself with respect to the speech station 12 by logging in, and can have direct recourse to the user-defined settings without there being a need for any individual adjustment on-site using the user. However, the invention also comprises embodiments of users 11, 12, whereby, after logging in, the operator 25 can make additional changes to the functionality settings.

If instead of the operator 25 in FIG. 2, another operator logs into the speech station 12 in FIG. 2, the parameters for this other operator that are also stored in the memory 32 can equally be adopted.

Thus, in cases of doubt it does not depend entirely on which individual device 11, 12 is assigned to the relevant operator, rather, the required information can be retained by saving it correspondingly in the device's 27 memory 32.

In the embodiment according to FIG. 2, the device 27 for managing operators is provided autonomously in the speech station 12, i.e. in the user 11.

Equally, all of the users 11 depicted in the intercom system 10 in FIG. 1 can have their own such device 27.

However, the invention also includes a situation where the device 27 for managing operators is provided in a decentralized way. For example, components of this device for managing operators, e.g. a component 27a according to FIG. 1, can also be provided in one or a number of switching centers 19a, 19b.

To this extent, components 27a of the device 27 for managing operators can be provided in the switching center 19a, 19b and maintain an appropriate data exchange with other components such as, for example, the device 27 according to FIG. 2 in the speech station.

The decision as to the degree to which the intelligence of the device 27 for managing operators is dealt with in a decentralized manner, i.e. is shared between a number of users 11a, 11b, 11c, 11d, 11e, 11f, 11g, or a centralized manner, i.e. provided essentially in a switching center 19a, is left to the expert to make according to the required conditions.

According to the embodiment in FIG. 1, the intercom network 10 also has a mobile user 11g in the form of a belt pack 13. This is depicted only schematically in FIG. 1 and in more detail in FIG. 3.

According to FIG. 1 the switching center 19a has a communication module 31 that can establish a radio link to the belt pack 13 according to the DECT standard. For this purpose the belt pack 13 has a communication module 30, and the switching center 19a has a communication module 31, which can enter into a radio link with one another in order to transmit audio information.

The communication module 31 can be connected via a control line 36 to the component 27a of the device for managing operators, or directly to a microprocessor 20a in the switching center 19a. Moreover, FIG. 1 makes it clear that a memory 32a for saving parameter values in association with different operators can also be provided in the switching center 19a.

Moreover, in the context of the data exchange that must in any event be carried out between the individual users 11a, 11b, 11c, 11d, 11e, 11f, 11g and the switching centers 19a, 19b, an exchange can occur of the parameter values and associated information about the operators held in the memory 32a of the switching center 19a, or the memory 32 of the speech station 12 according to FIG. 2.

The structural setup of the belt pack 13 according to the invention will now be explained in accordance with FIG. 3: On the one hand, the belt pack can have—as in the speech station 12—destination selection keys 15e, 15f, which can be programmed. Equally, function keys 17b and 18b can be provided that correspond, for example, to the function keys 17, 18 of the speech station 12 according to FIG. 2.

The belt pack 13 is connected via a microphone port 28 or a headset port to a headset 37. The latter can have headphones 38 and a microphone 39.

The belt pack 13 in FIG. 3 has a communication module 30 with which it can implement an audio connection to the communication module 31 on the switching center 19a.

In order to log an operator 25 according to FIG. 3 into the belt pack 13 with aid of a counterpart NFC element 23, an NFC element 22b is provided on the belt pack 13. The NFC element 22b is connected to a device 27b for managing operators via a control line 33b. The device 27b for managing operators is connected to a memory 32b via a control line 34b. Parameter values and associated information about the operator 25 are stored in the memory 32b. If the operator 25 logs in by moving the counterpart NFC element 23 closer to the NFC element 22b on the belt pack 13, the user-defined pre-settings (settings) for the function elements 15e, 15f, 17b, 18b can be adopted. The corresponding processing is carried out either by the device 27b for managing operators or by an electronic component, which is not depicted, in the belt pack 13.

A configuration device by which a configuration of the intercom network 10 and/or the individual users 11a, 11b, 11c, 11d, 11e, 11f can be carried out, is not depicted in the figures. The configuration device can involve, in the simplest case, a computer that can be connected to one of the two switching centers 19a, 19b by, for example, a data cable port, and can enter into communication with the switching center 19a, 19b and enter the relevant parameter values and associations with the operator 25 into the memory 32a by the microprocessor 20a and/or by the device 27a, 27. Equally, this configuration device can, if necessary, directly address the speech station 12 according to FIG. 2, and there directly access the memory 32.

Embodiments of the invention comprise intercom networks 10 with only one switching center 19, or also with a number of switching centers, such as, for example, two switching centers 19a, 19b, as depicted in FIG. 1. Here it depends on the discretion of the expert whether such an intercom network is organized in a centralized or decentralized manner.

The second switching center 19b of the embodiment in FIG. 1 can have a similar or identical structure, as shown in FIG. 1 for switching center 19a. Thus it can also be provided that the belt pack can not only establish an audio radio link with the switching center 19a, but also with the switching center 19b. It is also conceivable and included in the invention that a belt pack 13 can establish an audio radio link with another stationary user 11a, 11b, 11c, 11d, 11e, 11f.

The description of the embodiments in the drawings relates to an NFC element 22 and a counterpart NFC element 23. In a further embodiment, which is not depicted but is encompassed by the invention, the elements 22, 22a, 22b, 22c, 22d, 22e, 22f depicted in the drawings are all RFID elements and the element 23 depicted according to the drawings is a counterpart RFID element.

The invention claimed is:

1. A first communication station of an intercom network in combination with a second communication station of the intercom network,
    the first and second communication stations being configured for carrying out real-time audio communication with other communication stations of the intercom network during a live event,
    the first communication station and the second communication station each comprising:
    operating elements actuatable to provide direct audio communication with at least one of the other communication stations of the network;
    an audio input;
    a connection port or a communication module for connecting the communication station with another communication station of the intercom network, the first and second communication stations each having a functionality including at least one of display brightness, speaker volume, programming of the operating elements, and microphone sensitivity that can be set as respective parameters;
    a memory connected to the first and second communication stations and holding a plurality of sets each including at least one parameter of a respective functionality, the sets each being personalized for a respective operator of the communication station; and
    a respective NFC element or an RFID element on each of the first and second communication stations for communicating with a counterpart NFC element or a counterpart RFID element allocated to an operator and for, on the counterpart NFC or RFID element approaching the first or the second communication station, setting in the approached communication station the respective parameter for the operator.

2. The first communication station according to claim 1, wherein the counterpart NFC element is a component of an object that can be carried by the operator.

3. The first communication station according to claim 1, wherein with the counterpart NFC element assigned to the operator and information about the operator can be transmitted to the NFC element of the first communication station.

4. An intercom network for carrying out real-time audio communication between communication stations that are each connected to a switching center via a connecting line or via a radio link, connections between the communication stations being switchable by the switching center, at least one of the communication stations is configured as a stationary communication station in the form of a speech station or as a mobile communication station in the form of a belt pack, at least one parameter of the communication station's functionality can be set, the intercom network comprising at least a first and a second communication station according to claim 1.

5. The first communication station according to claim 1, wherein the functionalities and the respective parameters can be set in the first communication station manually.

6. The first communication station according to claim 1, further comprising:
  memory in the first communication station for recording a plurality of sets of parameters each personalized for a respective operator such that each operator can automatically select the respective set of parameters by approaching his/her respective counterpart element to the first communication station.

7. The first communication station according to claim 1, wherein the station has a plurality of functionalities each with a respective parameter and the memory holds for each operator a respective set of parameters of the functionalities.

8. A first communication station of an intercom network in combination with a second communication station of the intercom network, the first and second communications stations being configured for carrying out real-time audio communication with other communication stations of this intercom network during a live event, the first and second communication stations each comprising:
  operating elements actuatable to provide direct audio communication with at least one of the other communication stations of the network, at least one of the operating elements being programmable to provide direct audio communication to a selected one of the other communication stations or to a selected group of the other communication stations;
  an audio input;
  a connection port or a communication module for connecting the station with the other communication stations of the intercom network;
  a memory connected to the first and second communication stations and holding a plurality of sets each including information about a selected one of the other communication stations or about a selected group of the other communication stations, the sets each being personalized for a respective operator of the communication station; and
  a respective NFC element or an RFID element on the first and second communication stations for communicating with a counterpart NFC element or a counterpart RFID element allocated to an operator and for, on the counterpart NFC or RFID element approaching the communication station, triggering in the approached first or second communication station the respective parameter for the operator.

9. An intercom network for carrying out real-time audio communication during live events, comprising a plurality of communication stations,
  at least some of the plurality of communication stations to be operated during the event by one of a plurality of operators,
  each of the communication stations providing a plurality of programmable operating elements to the respective operator of the communication station,
  each of the operating elements being actuatable by the respective operator to provide direct audio communication to other communication stations of the network,
  each communication station comprising an audio input and a connection port or a communication module for connecting this communication station with the other communication stations of the intercom network,
  each of the plurality of communication stations having a functionality including at least one of
    display brightness,
    speaker volume,
    microphone sensitivity, and
    programming of the operating elements, that can be set as respective parameters;
  a memory in the network and holding a plurality of sets for a plurality of operators, each set including at least one parameter of a respective functionality,
  the sets each being personalized for the operators,
  each of the communication stations having an NFC element or an RFID element capable of communicating with one of a plurality of counterpart NFC elements or counterpart RFID elements, each of the counterpart NFC elements or counterpart RFID element allocated to a particular operator,
  and for on one of the counterpart NFC or RFID elements approaching any of the plurality of communication stations, associating the personalized set to this operator and setting the respective parameter for this operator in this approached communication station.

\* \* \* \* \*